United States Patent [19]

Nel

[11] Patent Number: 4,564,780
[45] Date of Patent: Jan. 14, 1986

[54] ELECTRICAL MACHINE HAVING A QUICKLY RELEASABLE STATOR

[75] Inventor: Gert Nel, Transvaal, South Africa

[73] Assignee: Eastway Holdings Limited, Middlesex, England

[21] Appl. No.: 589,002

[22] Filed: Mar. 13, 1984

[30] Foreign Application Priority Data

Mar. 14, 1983 [ZA] South Africa ............... 83/1722

[51] Int. Cl.4 ................ H02K 15/02; H02K 15/16
[52] U.S. Cl. .............................. 310/258; 310/42
[58] Field of Search ................ 310/62, 254, 258; 310/40 MM, 42, 89, 254, 258, 260

[56] References Cited

U.S. PATENT DOCUMENTS

| | | | |
|---|---|---|---|
| 1,415,564 | 11/1920 | Holahan | 310/258 |
| 1,822,096 | 9/1931 | Hollander | 310/258 |
| 1,978,100 | 10/1934 | Buerke | 310/258 |
| 2,401,662 | 6/1946 | Divi | 310/258 |
| 3,519,857 | 7/1970 | Plumb | 310/258 |
| 3,916,233 | 10/1975 | Vockler | 310/89 |
| 4,007,386 | 2/1977 | Rustecki | 310/42 |
| 4,051,399 | 9/1977 | Stanwick et al. | 310/258 |
| 4,134,036 | 1/1979 | Curtiss | 310/258 |
| 4,162,419 | 7/1979 | DeAngelis | 310/62 |
| 4,318,218 | 3/1982 | Nelson | 310/258 |

FOREIGN PATENT DOCUMENTS

| | | |
|---|---|---|
| 17075 | 3/1980 | European Pat. Off. . |
| 268187 | 10/1912 | Fed. Rep. of Germany . |
| 176587 | 9/1961 | Sweden . |
| 915172 | 3/1982 | U.S.S.R. . |

Primary Examiner—Peter S. Wong
Assistant Examiner—D. L. Rebsch
Attorney, Agent, or Firm—Burns, Doane, Swecker & Mathis

[57] ABSTRACT

An electrical motor has a casing 62 and a removable end plate 68. When the end plate 68 is removed the stator 50 can slide out of the casing 62 for servicing or repair without disturbing the rest of the motor in any way. Annular hampered mating surfaces insure accurate centering.

8 Claims, 4 Drawing Figures

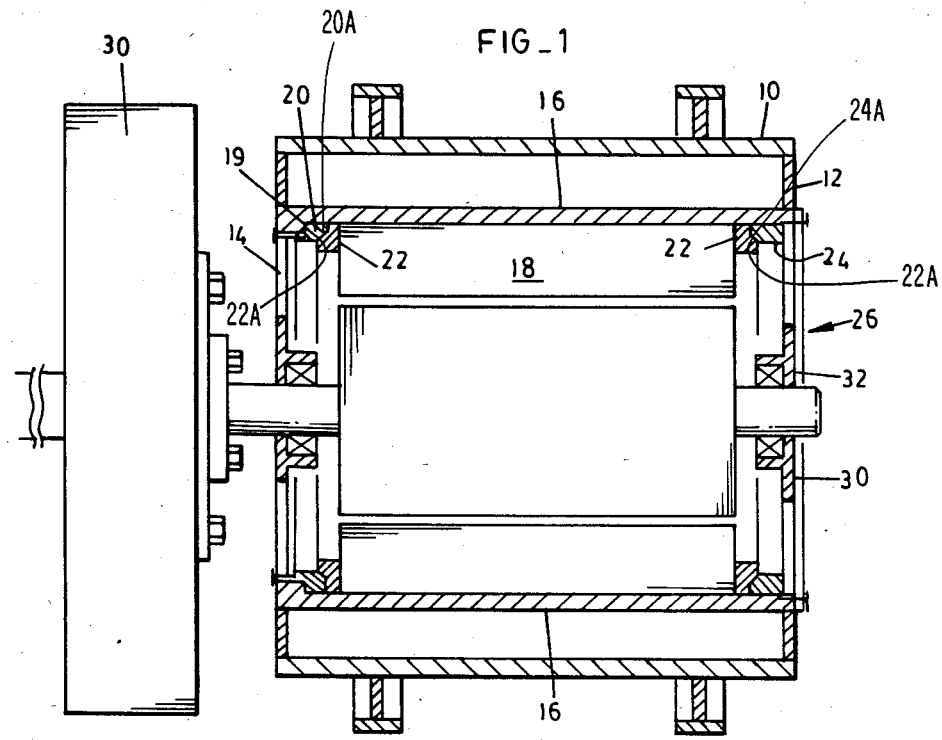
FIG_1
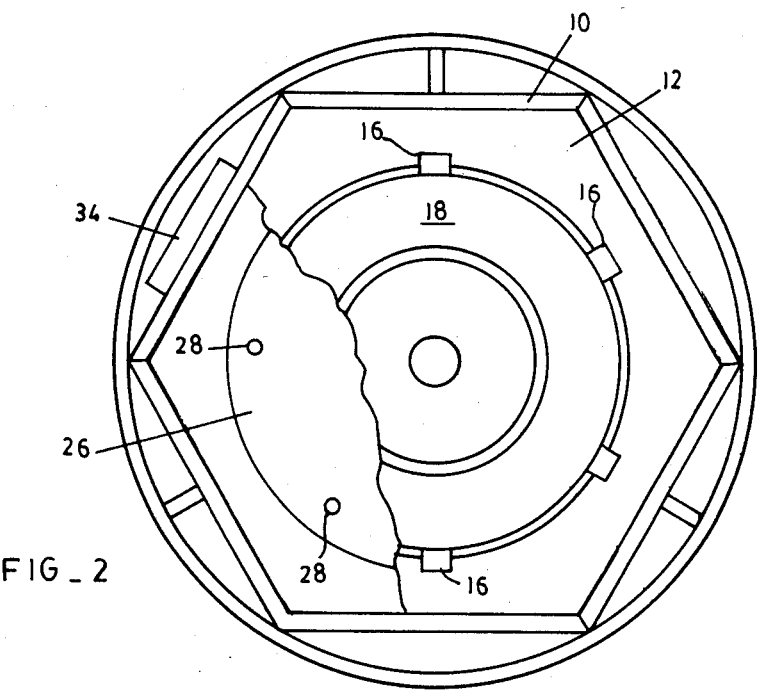
FIG_2

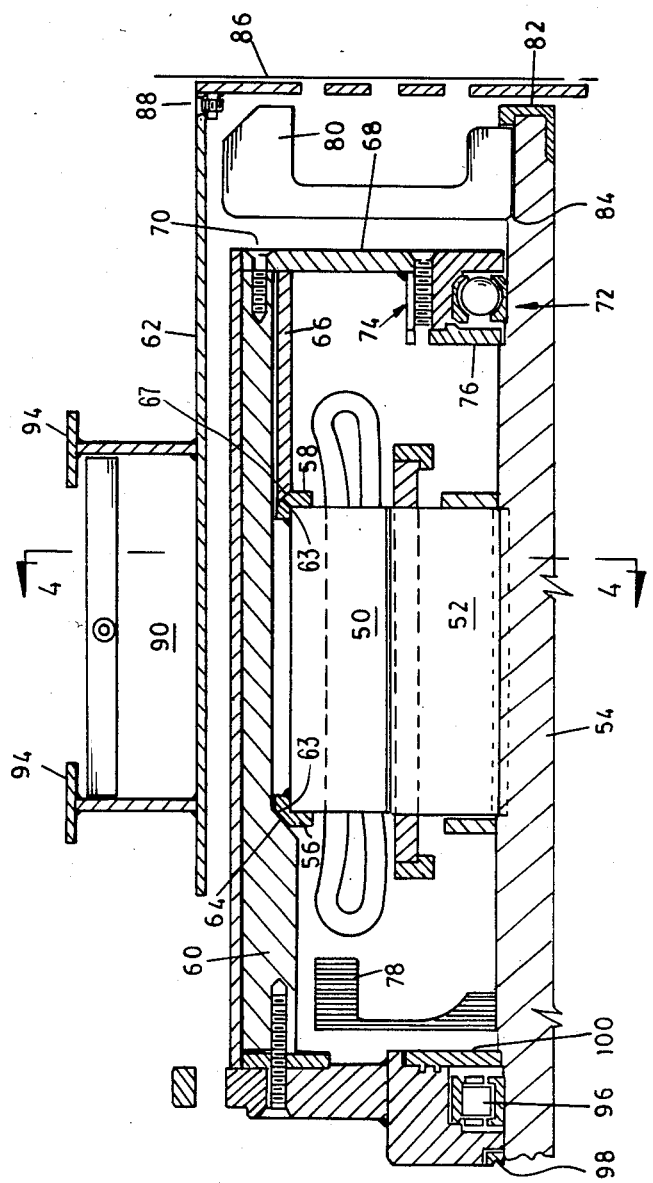
FIG_3

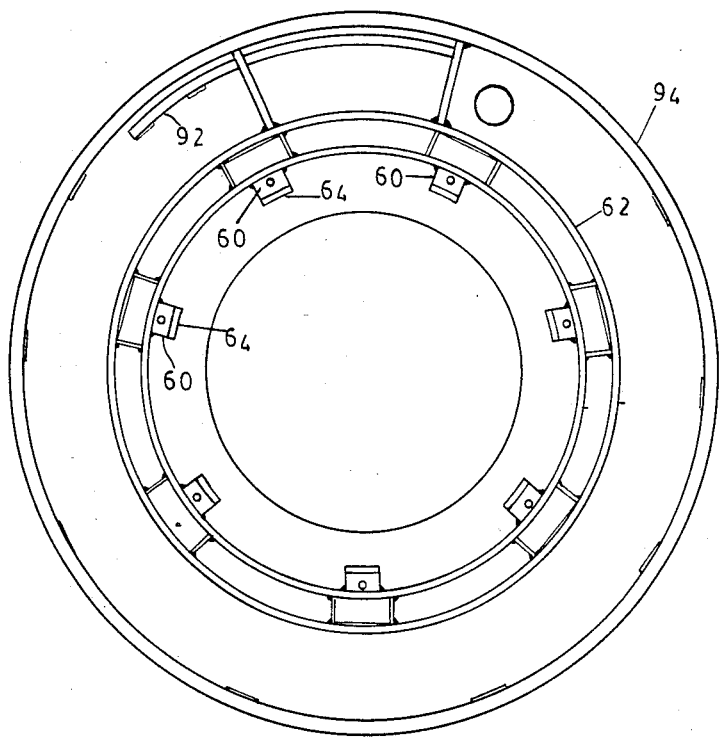
FIG_4

ELECTRICAL MACHINE HAVING A QUICKLY RELEASABLE STATOR

BACKGROUND OF THE INVENTION

The invention relates to electrical machines.

The invention relates more particularly, although not exclusively, to heavy duty electrical machines which are subjected to adverse conditions, are mechanically coupled to machinery in use and are not readily serviceable in situ. Such electrical machines are found in operation in deep mining workings and like environments for example. At present, failure of such machines requires a mechanical decoupling of the machine from a pump, a cutter and the like and disconnection of the machine from an electrical power supply. The electrical machine de-coupling and disconnecting must be carried out by skilled personnel and the machine removed and taken to a service workshop for repair or servicing. This generally results in considerable loss of production time. Even if a spare machine is available in situ, the alignment of the replacement machine, the mechanical coupling and electrical connection can take a considerable time period. It has been found in practice that faults occurring in stators of electrical machines represent a frequent cause of electrical machine failure.

It is an object of the invention to reduce the present problems associated with the occurrence of stator faults.

SUMMARY OF THE INVENTION

According to the invention there is provided an electrical machine having an outer casing, a stator slidably supported in its operative position in the casing, and an end plate for the casing which is removable, to allow the stator to slide from its operative position and out of the end of the casing.

The stator may be provided with electrical connections positioned within the casing which can be disconnected when the end plate is removed. The stator may be provided with electrical connections which slide into contact when the stator is moved fully into its operative position. Both arrangements enable the stator to be removed without disconnecting externally mounted power supply connections which are conventionally connected to a terminal box mounted on the exterior of the casing.

Preferably the end plate, when secured to the casing, retains the stator in its operative position. The casing may support an array of bars, each of which extends parallel to the longitudinal axis of the motor and which provide sliding support surfaces for the stator.

The stator may be provided with a circumferential ring around each end of the stator, the rings providing sliding surfaces for co-operation with the casing or the bars.

Embodiments of the invention therefor enable the stator of the electrical machine to be removed for repair or replacement generally without skilled or at least specially certificated labor. Stators can be removed and installed in a short time period without mechanically de-coupling the machine from a pump or a cutter for example and without disconnecting the externally connected electrical power cables. This means that the down-time of such a machine in the event of the occurrence of a stator fault may be only a few minutes and say not more than 20 to 30 minutes if a replacement serviceable stator is available for immediate installation. Further, the faulty stator in most machines can be manually lifted, removed and readily transported to a remote servicing workshop for repair.

Embodiments of the invention can provide the added advantage that instead of keeping spares in the form of complete machines only spare stators are required to deal with and place the majority of failed machines quickly back into a servicable condition. This is because as mentioned earlier a high proportion of machine failures, especially in mining industry applications, are due to the occurrence of stator faults.

Whereas embodiments of the invention normally comprise AC machines having generally annular shaped stators, embodiments of the invention can be provided in the form of D.C. machines. In one such embodiment the field windings of the D.C. machine are mounted on and supported by a generally annular cage or frame which is arranged to slide in and out of the casing as required and to be secured in position relative to the rotor by a removable end plate.

The casing may be provided with two or more hoops which are supported by the casing and displaced from it. The hoops enable the electrical machine to be readily rolled instead of being lifted or dragged during manhandling of the machine before installation in situ or when the whole machine is to be removed to a new location.

BRIEF DESCRIPTION OF THE DRAWINGS

A.C. electrical machines according to the invention will now be described by way of example with reference to the accompanying schematic drawings in which:

FIG. 1 is a cross-sectional side view of a motor;

FIG. 2 is an end view of the motor;

FIG. 3 is a sectional side view of half of a totally enclosed motor; and

FIG. 4 is a section on 4—4 of FIG. 3 with the stator and rotor removed.

DESCRIPTION OF A PREFERRED EMBODIMENT

Referring to the drawing, in FIGS. 1 and 2 the motor has a casing 10 which includes end parts 12 and 14 which support six bars 16. The bars 16 extend the length of the motor. The bars 16 are ground after fixing to the end parts 12 and 14 by a grinder so that the separation of their inwardly directed surfaces are equal to the outside diameter of a stator 18. A step 19 is provided at one end of each of the bars 16 against which a shaped ring 20 nestles. The stator 18 has rings 22 fixed to each of its ends which have chamfered contact surfaces 22A which face in opposite directions and nestle against chamfered locating surfaces 20A, 24A of the ring 20 and a similar ring 24 respectively to clamp the stator between the locating surfaces. An end plate 26 is secured to the end part 12 by screws 28 and has a central flange 30 which fits over a shaft bearing 32.

In order to remove the stator 18, the end plate 26 is removed to release the ring 24. Usually the flange 30 slips off the bearing 32 as the end plate 26 is removed. The shaft may be arranged with a retaining circlip as a precaution to prevent the bearing 32 from sliding off the shaft when the end plate 26 is removed, if desired. The stator 18 can then slide out of the motor beyond the end part 12 along the support surfaces defined by the bars 16. The ring 20 can then be removed if desired.

To place a stator 18 in the motor the procedure above is reversed. The securing of the end plate 26 to the end part 12 has the effect of holding the stator 18 in its required position.

It will be noted that the stator 18 can be removed simply by releasing six screws holding the end plate 26 and sliding the stator 18 out of the casing 10. The mechanical coupling to a flywheel 30 of a compressor (not shown) is not disturbed, neither is the rotor of the motor, so that the removal and replacement of the stator 18 is a simple and speedy operation.

Although not shown in the drawing, the stator has electrical terminals which protrude from the stator 18 towards a conventional box terminal 34 mounted on the outside of the casing 10. The terminals slide into conductive sleeves (not shown) and are fixed in position by screws. When the end plate 26 is removed, the heads of the screws are accessible by a screwdriver when it is held in position adjacent the end part 12. By loosening the screws, the stator terminals are released. Thus, the external electrical power connections (not shown) attached in the terminal box need not be disconnected when the stator 18 is required to be removed.

In the described arrangement the motor is provided with only one removable end plate 26. In a modified embodiment the machine is provided with an end plate 26 at each end of the casing 10. The step 19 is not present. This enables the stator 18 to be removed from either end of the casing 10. Such an arrangement is preferred when the motor can be mechanically coupled at either end of the main shaft. With the modified embodiment the stator can be easily removed, as described above, by removing whichever end plate is the more convenient.

If the modified motor is mechanically coupled at both ends of its shaft when in use, then uncoupling of one end of the shaft must be carried out before the respective end plate is removed. However, in practice it will be normally a relatively simple operation to uncouple only one end of the shaft in order to remove the stator 18.

Referring to FIGS. 3 and 4, the motor has a stator 50 and a rotor 52 mounted on a main shaft 54. The stator has chamfered circumferential end rings 56 and 58 which slide in an array of bars 60 (see FIG. 4) supported by the motor casing 62. The end rings 56, 58 include chamfered contact surfaces 63 which each face longitudinally outwardly and radially outwardly. The stator 50 is prevented from sliding beyond its operative position, as shown in FIG. 3, because the bars 60 have chamfered locating surfaces 64 reducing the effective diametrical separation between the bars 60. The stator 50 is prevented from moving in the opposite direction, to the right in FIG. 3, by a sleeve 66 which has a chamfered end 67 abutting against the ring 58; the sleeve is held in position by an end plate 68. The end plate is bolted to the ends of the bars 60 by sucken headed bolts 70.

An end bearing 72 for the motor is held in a hub 74 at the central region of the end plate 68 which bolts onto a flange plate 76. The hub 74 is a sliding fit onto the outside circumferential surface of the bearing 72 to allow easy removal of the end plate 68 from the bearing. The outer surface of the bearing 72 is prevented from rotating relative to the hub 74 by inwardly facing chamfered corners in the hub 74 and on the plate 76.

The motor is provided with two air circulating fans 78 and 80. The fan 80 is readily removable, being secured in its operative position by a central cap 82 which is held in position by a screw 83. The fan includes a chamfered stop surface 85, and the shaft 54 includes a chamfered limiting surface 84. The fan 80 is a sliding fit on the shaft 54, and in use it is prevented from relative rotation with the shaft 54 by the provision of pressure on the 45° chamfered surfaces 84, 85 caused when the cap 82 is pressed tightly against the center of the fan 80. An apertured end plate 86 is held by screws 88 to the casing 62.

The stator 50 is provided with protruding male connectors (not shown) and the casing in the region of a terminal box 90 supports female connectors (not shown). The male and female connectors disengage when the stator is slid to the right so that no separate electrical disconnection is required when removing the stator for service or repair.

The terminal box 90 has an arcuate shaped lid (not shown) to allow access to connectors for external wiring. As explained earlier such connectors are of course not required to be disturbed when removing the stator 50. The lid cannot be removed completely from the box 90 because the lid is entrapped in slideways 92 (see FIG. 4).

The motor is provided with two hoops 94 allowing the motor to be easily rolled. This provides a significant advantage to protect the motor to some extent from direct external impacts on the casing 62 and more especially facilitates man-handling of the motor where required.

A bearing 96 is provided for the motor which is surrounded by labyrinth oil seals 98 and 100. Such seals prevent or tend to prevent, during any over-zealous greasing, leakages into the inside of the casing 62.

The motors described are generally for use as heavy duty pump motors, winch motors, fan motors and the like. Embodiments of the invention can, however, be provided which are applicable to light duty electrical machines such as swimming pool circulating pumps or even domestic appliance motors. The same general principles apply, namely stator failures represent a high proportion of causes of overall machine failures. By arranging, as described, for the stator to be readily removable and generally without mechanically disconnecting the main shaft of the motor at its output coupling or disturbing the rotor, unskilled persons can easily carry out the operation of changing a stator. Usually the electrical connections of the stator automatically disengage when the stator is slidingly removed making the removal and replacement of the stator extremely simple.

I claim:

1. An electrical machine comprising a casing, a rotor mounted within the casing, and a stator disposed coaxially around the rotor, the stator being axially slidable into and from said casing, annularly arranged chamfered contact surface means on axial ends of the stator and facing in opposite directions, annularly arranged chamfered locating surface means disposed within the casing in axially spaced relationship and arranged to engage and sandwich the contact surface means therebetween, and an end plate securable to an end of the casing for axially clamping said chamfered contact and locating surface means together, said end-plate being releasable to allow unclamping of said chamfered contact and locating surface means to enable the stator to be removed axially from the casing.

2. An electrical machine according to claim 1, in which said contact surface means include first and second longitudinally spaced chamfered contact surfaces each facing axially and radially outwardly, and said locating surface means include first and second longitudinally spaced chamfered locating surfaces in facing relationship to the first and second contact surfaces, respectively.

3. An electrical machine according to claim 1 including a hollow cylindrical sleeve having an end edge carrying said locating surface means which face said contact surface means on one end of said stator.

4. An electrical machine according to claim 3, wherein said sleeve is separate from said end-plate and is pushed against said stator by said end plate.

5. An electrical machine according to claim 1 including support surfaces attached to said casing and arranged to slidably support said stator within said casing, said support surfaces extending axially within the casing and defining a generally cylindrical space, the support surfaces each being interrupted by a chamfered shoulder which defines said locating surface means which face said contact surface means on one end of said stator.

6. An electrical machine according to claim 1, including an anti-friction bearing carried by said end plate, said rotor including a rotor shaft disposed in said bearing, said bearing including an outer portion of said bearing including chamfered surface means, and said end plate carrying chamfered surface means engaging said chamfered surface means on said outer bearing portion to prevent the latter from rotating.

7. An electrical machine according to claim 6, wherein said rotor shaft includes a portion of reduced diameter merging with a portion of larger diameter by means of a chamfered limiting surface facing radially and axially outwardly, an air circulation fan is removably mounted on said shaft and including a chamfered stop surface facing said chamfered limiting surface, and means urging said fan axially inwardly to press said chamfered stop surface against said chamfered limiting surface.

8. An electrical machine according to claim 1, wherein said rotor includes an output shaft, said end plate disposed at an end of said casing which is opposite the end at which said output shaft is disposed.

* * * * *